United States Patent
Kim et al.

(10) Patent No.: US 7,515,241 B2
(45) Date of Patent: Apr. 7, 2009

(54) BONDING STRUCTURE FOR FLAT PANEL DISPLAY AND METHOD HAVING OUTER AND INNER WALLS OF A PREDETERMINED INTERVAL HAVING SEALANT AND BONDED TO UPPER AND LOWER SUBSTRATES FOR UNIMPEDED CELL GAP BETWEEN THE SUBSTRATES AND THE INNER SEPARATION WALL

(75) Inventors: Su-gun Kim, Gyeonggi-do (KR); Sang-moo Park, Gyeonggi-do (KR); Soon-young Hyun, Seoul (KR); Won-nyun Kim, Seoul (KR); Jong-min Wang, Gyeonggi-do (KR); Gyu-min Lee, Gyeonggi-do (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 417 days.

(21) Appl. No.: 11/066,783

(22) Filed: Feb. 28, 2005

(65) Prior Publication Data
US 2005/0238853 A1 Oct. 27, 2005

(30) Foreign Application Priority Data
Apr. 23, 2004 (KR) .................. 10-2004-0028162

(51) Int. Cl.
*G02F 1/1339* (2006.01)
(52) U.S. Cl. .................. 349/153; 349/156; 349/157
(58) Field of Classification Search .......... 349/153–157
See application file for complete search history.

(56) References Cited

U.S. PATENT DOCUMENTS

| | | | | |
|---|---|---|---|---|
| 5,831,710 A * | 11/1998 | Colgan et al. | ............... | 349/156 |
| 6,016,180 A * | 1/2000 | Bradshaw et al. | ........... | 349/156 |
| 6,040,888 A * | 3/2000 | Masami et al. | .............. | 349/155 |
| 6,163,357 A * | 12/2000 | Nakamura | ................... | 349/155 |
| 6,593,992 B1 * | 7/2003 | Chin et al. | ................... | 349/153 |
| 6,624,516 B2 * | 9/2003 | Fujisawa et al. | ............. | 257/762 |
| 6,682,948 B2 * | 1/2004 | Wada | .......................... | 438/17 |
| 2002/0191141 A1 * | 12/2002 | Liao | ............................. | 349/155 |
| 2003/0020864 A1 * | 1/2003 | Yanagawa et al. | ........... | 349/155 |
| 2003/0116854 A1 * | 6/2003 | Ito et al. | ..................... | 257/761 |
| 2006/0030682 A1 * | 2/2006 | Hurley et al. | ............... | 525/485 |

FOREIGN PATENT DOCUMENTS

| | | |
|---|---|---|
| JP | 2003-66467 | 3/2003 |
| KR | 2001-0092355 | 10/2001 |
| KR | 2002-0008062 | 1/2002 |
| KR | 2003-0063059 | 7/2003 |

* cited by examiner

*Primary Examiner*—David Nelms
*Assistant Examiner*—John Heyman
(74) *Attorney, Agent, or Firm*—Buchanan Ingersoll & Rooney PC

(57) ABSTRACT

Provided are a bonding structure for a flat panel display and a method of forming the same, and a flat panel display, including the bonding structure. The bonding structure of a flat panel display device, which is formed between an upper substrate and a lower substrate to seal and bond the two substrates of the flat panel display device, and the bonding structure includes an outer separation wall and an inner separation wall of same heights being arranged along edges of the upper substrate and the lower substrate with a predetermined interval, and a sealant being applied between the outer separation wall and the inner separation wall.

37 Claims, 6 Drawing Sheets

BONDING STRUCTURE FOR FLAT PANEL DISPLAY AND METHOD HAVING OUTER AND INNER WALLS OF A PREDETERMINED INTERVAL HAVING SEALANT AND BONDED TO UPPER AND LOWER SUBSTRATES FOR UNIMPEDED CELL GAP BETWEEN THE SUBSTRATES AND THE INNER SEPARATION WALL

Priority is claimed to Korean Patent Application No. 2004-28162, filed on Apr. 23, 2004, in the Korean Intellectual Property Office, the disclosure of which is incorporated herein in its entirety by reference.

BACKGROUND OF THE INVENTION

1. Field of the Invention

The present invention relates to a flat panel display, and more particularly, to a bonding structure for sealing and bonding an upper substrate and a lower substrate of a flat panel display, a method of forming the bonding structure, and a flat panel display having the bonding structure.

2. Description of the Related Art

A flat panel display can be classified as: a liquid crystal display (LCD), a plasma display panel (PDP), or a field emission display (FED). Recently, a liquid crystal on silicon (LCOS), which forms a thin film transistor (TFT) on a silicon substrate and uses a liquid crystal to display an image, is highlighted due to the demand for a micro-display.

The LCOS panel is a micro-display panel that uses a switching characteristic of the liquid crystal. The LCOS panel is formed to be about one inch by integrating elements of pixels and a switching circuit, and it can realize higher definition than an extended graphics array (XGA) level. Accordingly, the LCOS panel is mainly used as a display in a projection system that expands and projects an image of a display device using an optical lens system. In the projection system using the LCOS panel, a rapid response of the liquid crystal is essential in displaying a moving picture, and especially, when a cell gap on the LCOS panel is reduced, the response time of the liquid crystal is also reduced. Thus, in the LCOS panel, the cell gap should be as small as possible in order to minimize the response time of the liquid crystal. Thus, unlike the general LCD that has a cell gap of 2~5 μm, the LCOS panel has a small cell gap about 1~2 μm due to the features of a reflective display device.

However, in a case where the LCOS panel having a fine cell gap is manufactured with respect to the response time of the liquid crystal, an optical interference may occur due to different sizes of cell gaps on the panel, thereby causing a reduction in the image quality of the panel. The above problem is caused by the different thermal properties of an upper substrate and a lower substrate in bonding the upper and lower substrates, or the fine cell gap. Therefore, in order to solve the above problem, it is essential to manufacture the panel to have constant cell gaps.

In the conventional art, in order to maintain a constant cell gap, a spacer may be applied in an active area, a post is disposed on an inter-pixel area, or the spacer may be included in a sealant to maintain a constant cell gap. However, the above methods cause problems in the LCOS panel having small pixels, unlike the LCD. That is, in a case where the spacer is applied on the active area, an arrangement of the liquid crystal is adjusted around the applied spacer, and thus the image may be damaged by the effected liquid crystal. In a case where the post is disposed, the post increases an inter-pixel size, and the panel size also becomes larger. In addition, the quality of the image may be reduced by the orientation defect of the liquid crystal around the post. Also, in a case where the cell gap is maintained by the spacer in the sealant by mixing the spacer in the sealant, it is difficult to compensate for a deformation of the panel, which is caused by the different thermal properties of the upper and lower substrates of the LCOS panel, and thus the cell gap does not have uniformity.

FIG. 1 is a cross-sectional view showing a part of a conventional flat panel display device. As shown in FIG. 1, a sealant 6 is applied between the lower substrate 2 and the upper substrate 4, and the cell gap between the lower substrate 2 and the upper substrate 4 is maintained by the spacer 8 that is embedded in the sealant 6. FIG. 2 is a vertical cross-sectional view showing the conventional flat panel display device. The uniformity of the cell gap shown in FIG. 2 becomes inconsistent when the lower substrate 2 and the upper substrate 4 become sealed to each other.

SUMMARY OF THE INVENTION

The present invention provides a bonding structure of a flat panel display device, which can prevent an infiltration of a sealant into an active area and maintain a constant cell gap.

The present invention also provides a method of forming the bonding structure of the flat panel display device.

The present invention also provides a flat panel display device including the bonding structure.

According to an aspect of the present invention, there is provided a bonding structure for a flat panel display device, which is formed between an upper substrate and a lower substrate to seal and bond the two substrates of the flat panel display device, the bonding structure including: an outer separation wall and an inner separation wall of equal heights being arranged along edges of the upper substrate and the lower substrate of a predetermined interval; and a sealant being applied between the outer separation wall and the inner separation wall.

According to another aspect of the present invention, there is provided a method of forming a bonding structure that is formed between an upper substrate and a lower substrate of a flat panel display to seal and bond the two substrates, the method including the operations of: forming a silicon oxide layer on at least one of the surfaces of the upper substrate and the lower substrate, which face each other; forming an outer separation wall and an inner separation wall to be of equal heights, which are arranged along edges of the upper and lower substrates with a predetermined interval between them, by patterning the silicon oxide layer; and applying a sealant in a space between the outer separation wall and the inner separation wall.

According to still another aspect of the present invention, there is provided a flat panel display comprising an upper substrate and a lower substrate facing each other with a predetermined interval, and a bonding structure formed between the upper and lower substrates to seal and bond the substrates. The bonding structure includes: an outer separation wall and an inner separation wall of equal heights being arranged along edges of the upper substrate the and lower substrate with a predetermined interval; and a sealant being applied between the outer separation wall and the inner separation wall.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a bonding structure of a flat panel display, a method of forming the bonding structure, and a flat panel display having the bonding structure according to exemplary embodiments of the present invention will be described with reference to accompanying drawings.

An exemplary bonding structure of a flat panel display will be described as follows.

Figure 1:
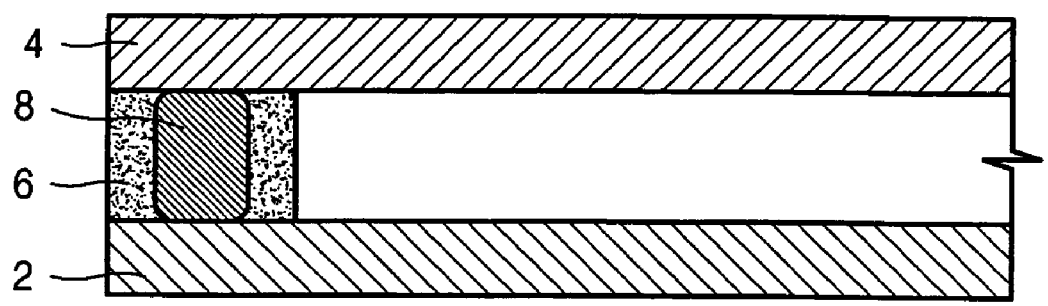
FIG. 1 is a partial cross-sectional view showing a flat panel display device according to the conventional art.
Figure 2:
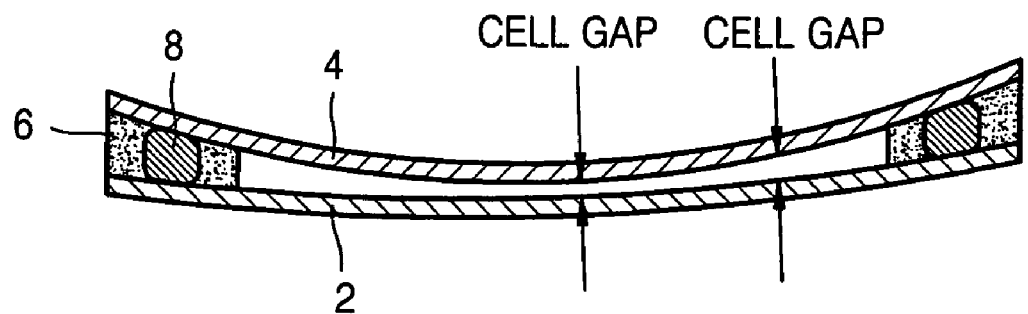
FIG. 2 is a vertical cross-sectional view showing the flat panel display according to the conventional art.
Figure 3:
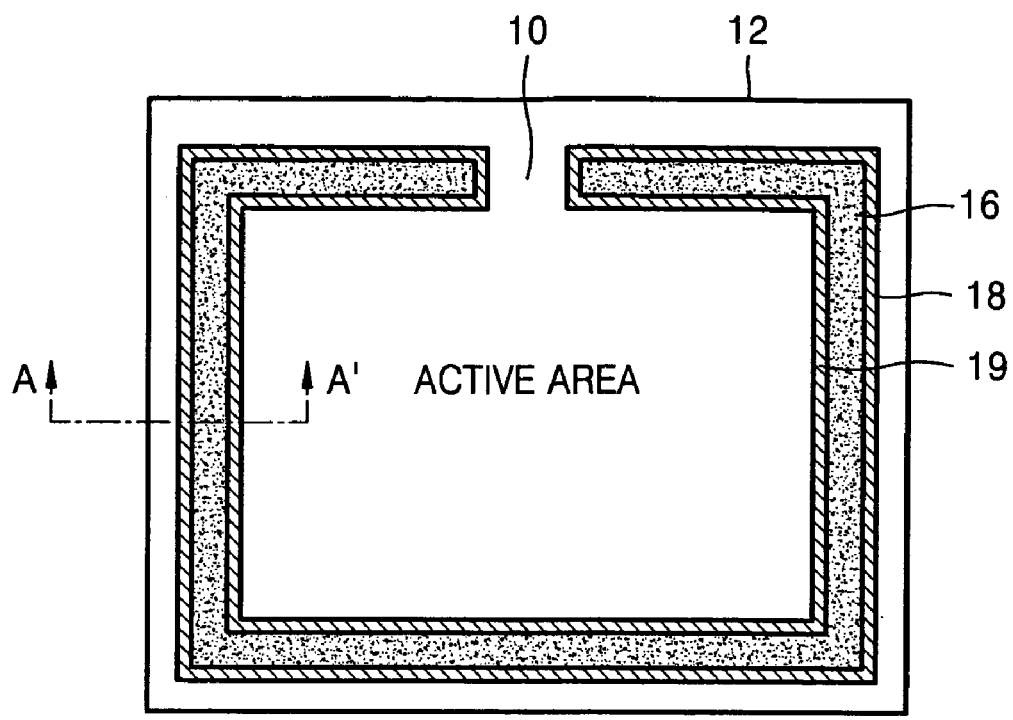
FIG. 3 is a plane view of a flat panel display showing an arranging form of a bonding structure according to an exemplary embodiment of the present invention.
Figure 4:
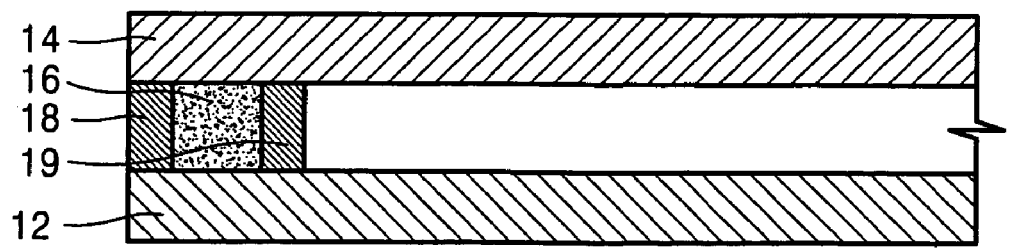
FIG. 4 is a cross-sectional view taken along line A-A' of FIG. 3.

FIG. 3 is a plane view of a flat panel display showing an arranging form of the bonding structure according to an exemplary embodiment of the present invention, and FIG. 4 is a cross-sectional view taken along line A-A' of FIG. 3.

Referring to FIGS. 3 and 4, the bonding structure of the flat panel display is formed between an upper substrate 14 and a lower substrate 12 of the flat panel display to seal and bond the two substrates 12 and 14 to each other. The bonding structure includes an outer separation wall 18 and an inner separation wall 19, which are of equal heights and disposed in parallel with a predetermined interval therebetween along an edge of the upper and lower substrates 14 and 12, and a sealant 16 applied to a space between the outer separation wall 18 and the inner separation wall 19.

The outer separation wall 18 and the inner separation wall 19 can be formed of a material having a thermal expansion coefficient that is smaller than that of the sealant 16, which is applied therebetween and a Young's module that is larger than that of the sealant 16, such as silicon oxide, $SiO_2$.

In addition, the outer and inner separation walls 18 and 19 are disposed between the upper and lower substrates 14 and 12, and can be formed on at least one of the upper and lower substrates 14 and 12, which face each other. In more detail, the separation walls 18 and 19 can be formed on an upper surface of the lower substrate 12, or on a bottom surface of the upper substrate 14. Also, the separation walls 18 and 19 can be formed on both of the upper and lower substrates 14 and 12.

Each of the outer separation wall 18 and the inner separation wall 19 can be formed to have a height about 0.01 μm~10000 μm, and it is desirable that the heights of the both inner and outer separation walls 19 and 18 are about 1 μm on an LCOS panel. In addition, each of the outer separation wall 18 and the inner separation wall 19 can be formed to have a width about 1 μm~10000 μm, and it is desirable that the width of the outer separation wall 18 or the inner separation wall 19 is about 30 μm on the LCOS panel.

Hereinafter, a method of forming the bonding structure according to the exemplary embodiment of the present invention will be described.

The method of forming the bonding structure includes the operations of forming a $SiO_2$ layer on a lower substrate 12, forming the outer separation wall 18 and the inner separation wall 19 by patterning the $SiO_2$ layer, and applying the sealant between the outer and inner separation walls 18 and 19.

The silicon oxide layer of a desired thickness, for example, the $SiO_2$ layer, is formed on the lower substrate 12 by a plasma enhanced chemical vapor deposition (PECVD) method. In addition, a photoresist is applied onto the $SiO_2$ layer, and a soft baking process is performed. Then, the photoresist is partially exposed using a photo mask having patterns of the outer and inner separation walls 18 and 19. When the exposed photoresist is developed, an etching mask, including the patterned photoresist, is formed on the $SiO_2$ layer.

In addition, when the $SiO_2$ layer is dry-etched using the etching mask, the $SiO_2$, which is on a portion covered by the etching mask remains to form the outer separation wall 18 and the inner separation wall 19.

When the sealant 16 is applied between the outer and inner separation walls 18 and 19, the bonding structure of the present invention can be completed. The upper substrate 14 and the lower substrate 12 can be sealed using the bonding structure, and the cell gap can be maintained at a constant.

On the other hand, in the above description, the outer and inner separation walls 18 and 19 are formed on the upper surface of the lower substrate 12, these can be formed on a bottom surface of the upper substrate 14 or on the upper and lower substrates 14 and 12 in the above method.

Figure 5:
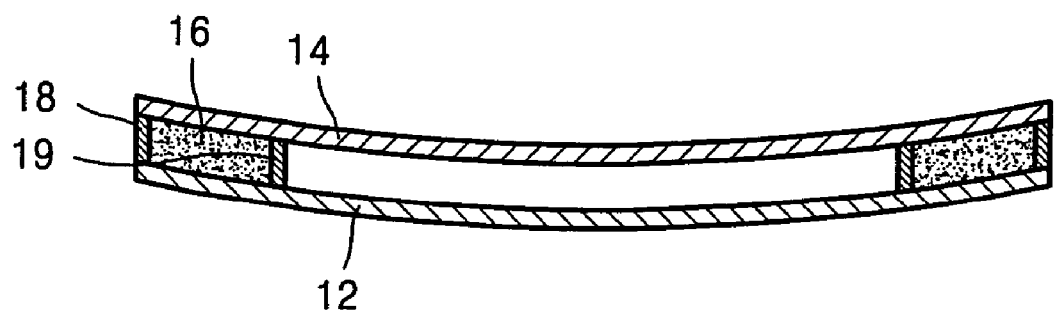
FIG. 5 is a vertical cross-sectional view showing a flat panel display including the bonding structure according to the exemplary embodiment of the present invention.

FIG. 5 is a vertical cross-sectional view showing a flat panel display including the bonding structure of the present invention. As shown in FIG. 5, the uniformity of the cell gap is improved. The sealing and bonding process of the upper and lower substrates 14 and 12 includes a cooling process, and at that time, the sealant 16 between the outer and inner separation walls 18 and 19 forces the upper and lower substrates 14 and 12, thus a camber of the active area of the flat panel display can be compensated for and the uniformity of the cell gap can be improved. In more detail, a deviation of the cell gap uniformity between the upper and lower substrates 14 and 12 is in a range of −5~+5%.

Therefore, in the bonding process of the upper and lower substrates 14 and 12, a yield of the conventional art using the spacer is about 20%. However, in the present invention, the yield can be improved to more than 70% by using the bonding structure.

According to the bonding structure, the infiltration of the sealant 16 into the active area can be prevented by the two separation walls 18 and 19, a flow of the liquid crystal can be improved to be smooth when the liquid crystal is injected into the display. In addition, the infiltration of gas that is generated by the sealant 16 in a thermal process of the sealant 16 into the active area can be prevented.

Also, since the cell gap of the flat panel display can be maintained at a constant by the outer and inner separation walls 18 and 19 that are formed of $SiO_2$, the additional spacer is not required, and the manufacturing costs of the flat panel display can be reduced.

On the other hand, the outer and inner separation walls 18 and 19 in the bonding structure can be modified as follows.

Figure 6:
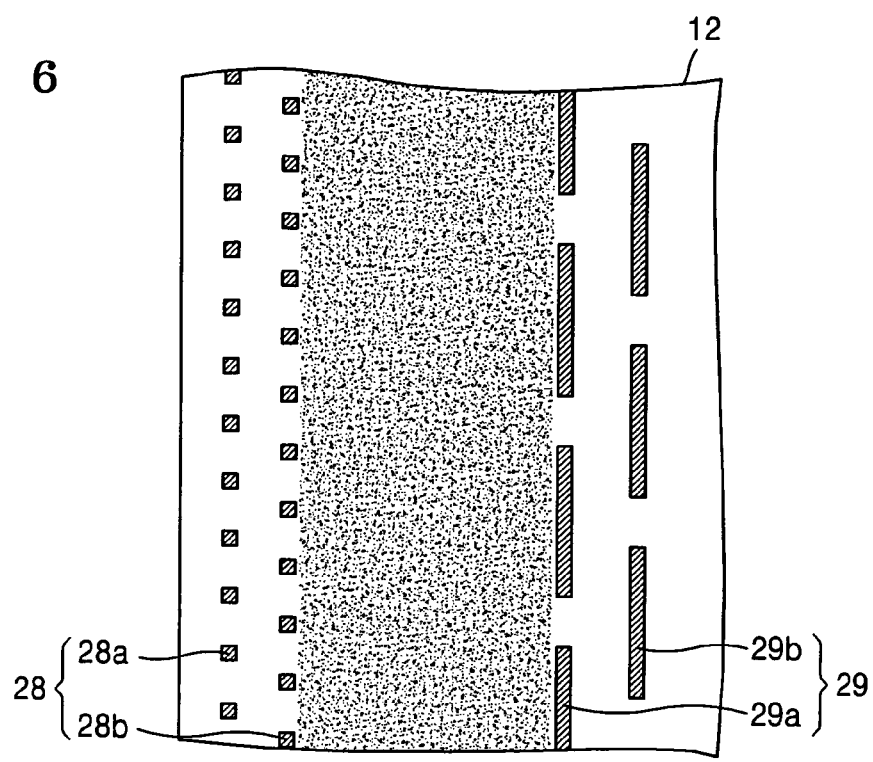
FIGS. 6 through 8 are partial plane views showing various shapes of the bonding structure according to exemplary embodiments of the present invention.
Figure 7:
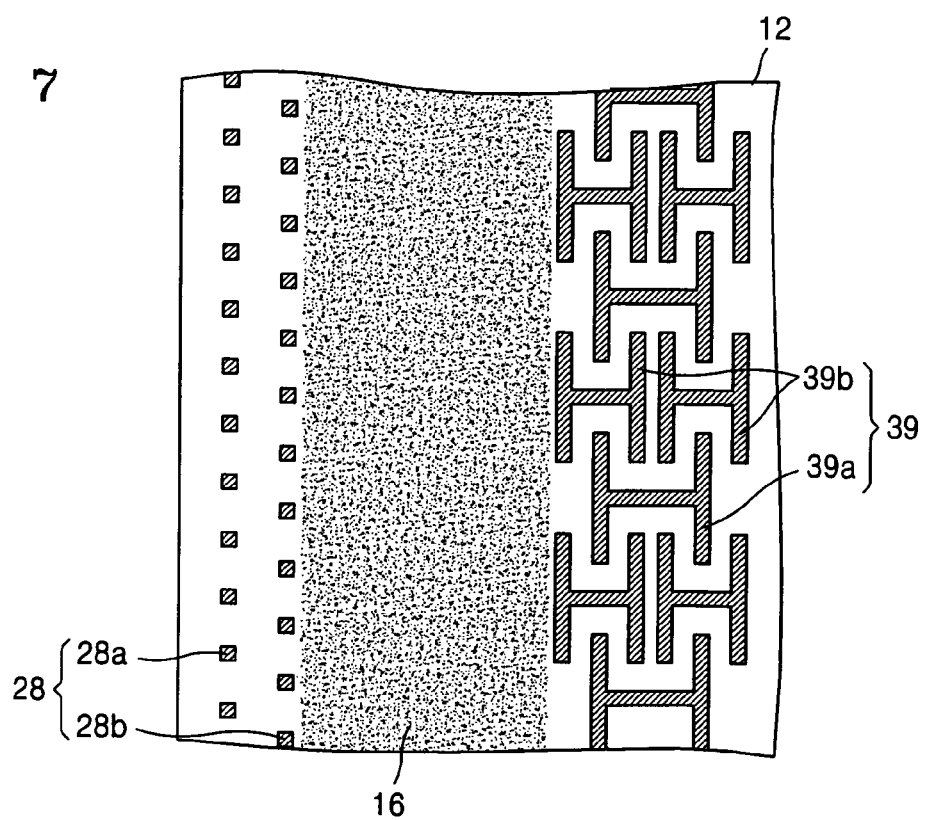
Figure 8:
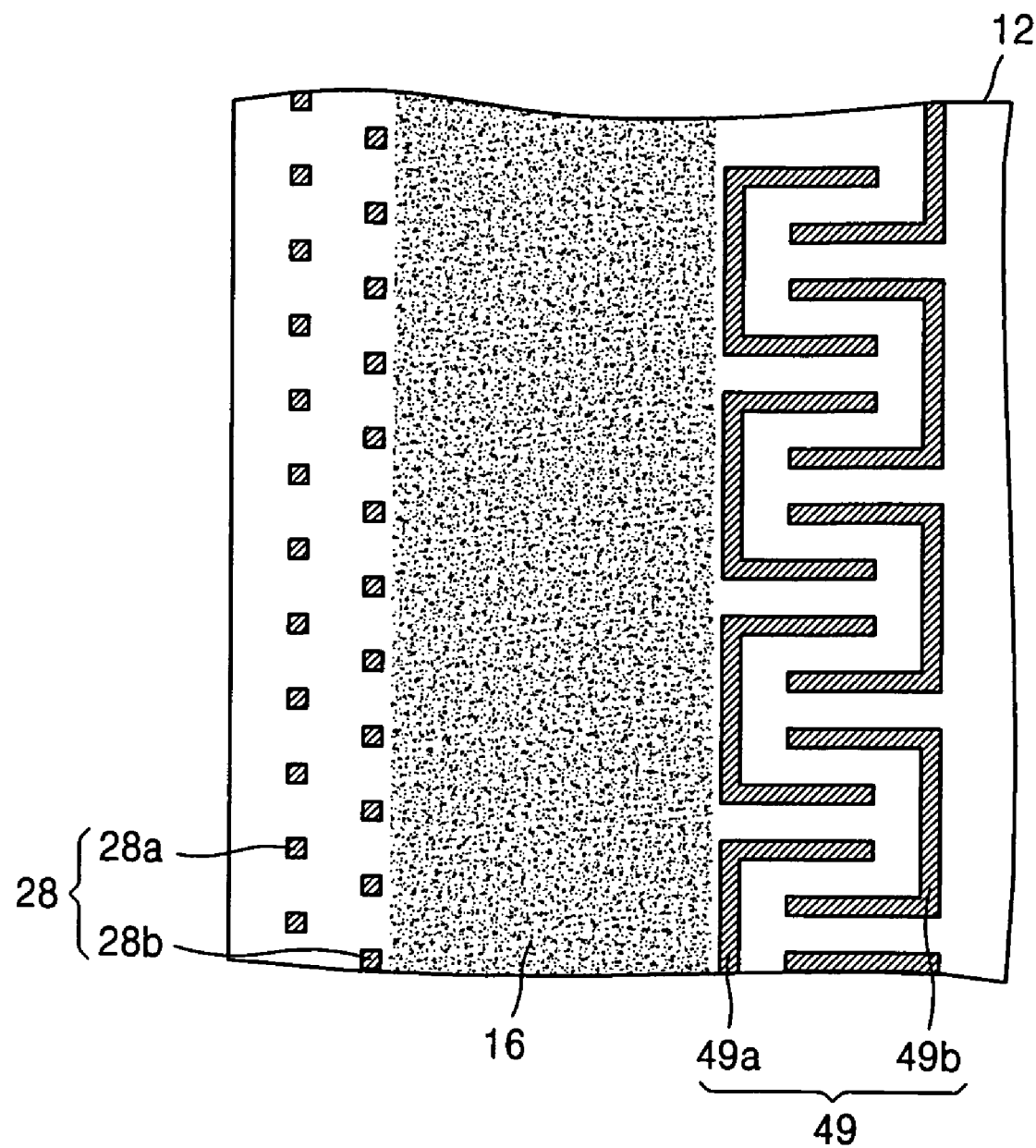

FIGS. 6 through 8 are partial cross-sectional views showing modifications of the bonding structure according to the exemplary embodiments of the present invention.

Referring to FIGS. 6 through 8, an outer separation wall 28 can include a plurality of posts 28a and 28b that are arranged in two rows. In addition, the posts 28*a* arranged in a first row and the posts 28*b* arranged in a second row could be positioned to cross each other, i.e., be offset from each other.

According to the present invention, the inner wall can be formed variously (29, 39, and 49). Referring to FIG. 6, the inner separation wall 29 can include a plurality of bars 29*a* and 29*b* that are arranged in two rows. In addition, the bars 29*a* disposed in a first row and the bars 29*b* disposed in a second row can be positioned to cross each other. i.e., be offset from each other. The bars 29*a* and 29*b* can overlap each other.

Referring to FIG. 7, the inner separation wall 39 includes a plurality of micro beams 39*a* and 39*b*, which all have an 'H' shape. In more detail, the inner separation wall 39 can be formed by alternately arranging one beam 39*a* followed by a pair of beams 39*b*. The beams 39*a* can overlap with beams 39*b*.

The inner separation wall 49 shown in FIG. 8 includes a plurality of micro beams 49*a* and 49*b* of 'U' shapes that are arranged in two rows. In addition, the micro beams 49*a* in the first row and the micro beams 49*b* in the second row face each other, and cross each other. i.e., be offset from each other. The micro beams 49*a* can overlap with micro beams 49*b*.

According to the bonding structure having the outer separation wall 28 and the inner separation wall 29, 39, or 49 shown in FIGS. 6 through 8, the upper and lower substrates 14 and 12 can be supported more securely, and the bonding structure can prevent the sealant 16 applied between the outer separation wall 28 and the inner separation wall 29, 39, or 49 from being released out of the outer separation wall 28 or infiltrating into the active area over the inner separation wall 29, 39, or 49. Also, the gas that is generated from the sealant 16 in the thermal process of the sealant can be discharged easily through the outer separation wall 28, thus the gas does not infiltrate into the active area.

Figure 9:
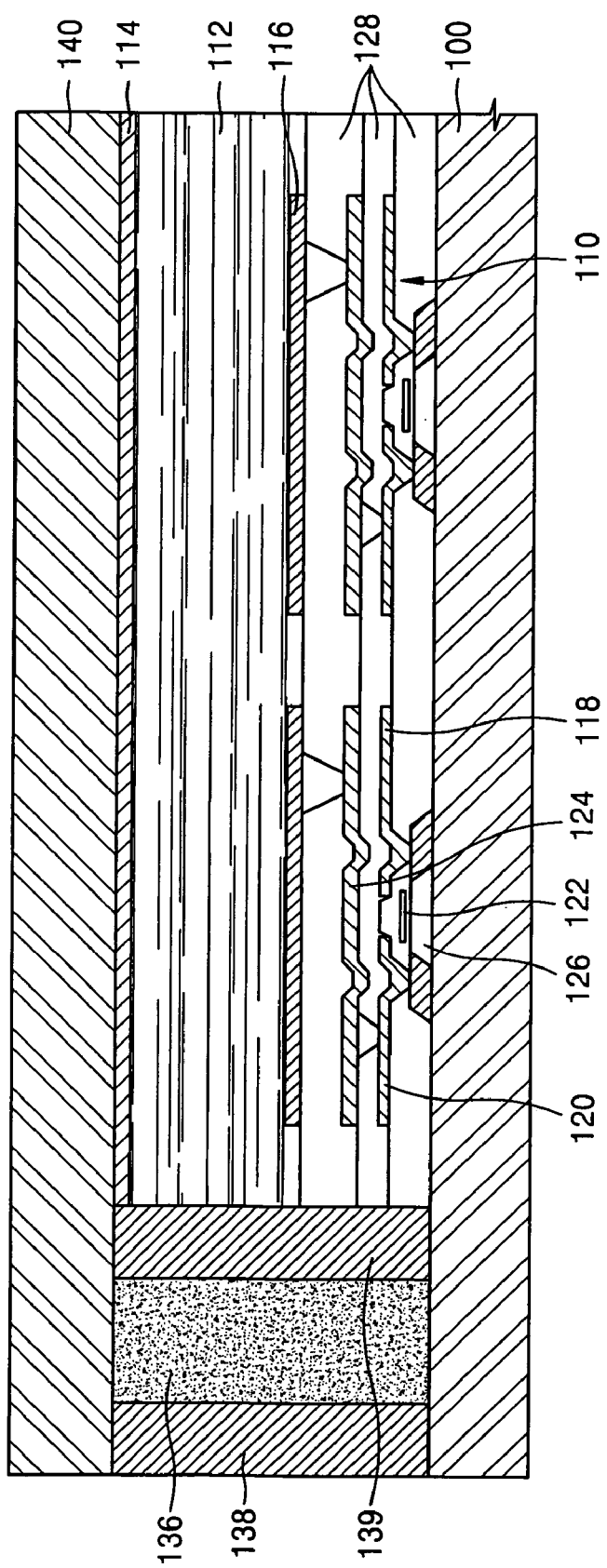
FIG. 9 is a partial cross-sectional view showing a liquid crystal on a silicon (LCOS) panel including the bonding structure according to an exemplary embodiment of the present invention.

FIG. 9 is a partial cross-sectional view showing the LCOS panel including the bonding structure according to the present invention.

Referring to FIG. 9, the LCOS panel includes a semiconductor substrate 100 including a plurality of semiconductor integrated circuits 110, that is, switching circuits, a transparent substrate 140 facing the semiconductor substrate 100, a liquid crystal layer 112 located between the semiconductor substrate 100 and the transparent substrate 140, an outer separation wall 138 and an inner separation wall 139 that are arranged in parallel with a predetermined interval along the edges of the semiconductor substrate 100 and the transparent substrate 140, and a sealant 136 applied between the outer separation wall 138 and the inner separation wall 139.

A transparent electrode 114 that is formed of a transparent conductive material such as an indium tin oxide (ITO), is formed on a surface of the transparent substrate 140, which faces the liquid crystal layer 112, and a reflective electrode 116, for example, an aluminum film, is formed on each pixel on a surface of the semiconductor substrate 100, which faces the transparent substrate 140. When the transparent electrode 114 and the reflective electrode 116 are combined to form a pixel, the transparent electrode 114 and the reflective electrode 116 perform as a common electrode and a pixel electrode, respectively. Here, alignment layers (not shown) are formed on surfaces of the transparent electrode 114 and the reflective electrode 116 to align liquid crystal molecules in a common direction, and in the LOGS panel, the cell gap of about 1 μm is constantly maintained by the bonding structure, including the outer separation wall 138 and the inner separation wall 139, and the sealant 136 applied between the outer and inner separation walls 138 and 139.

Specifically, the reflective electrode 116 is electrically connected to the semiconductor integrated circuit 110, which is disposed on each pixel, and the semiconductor integrated circuit 110 includes a source 118, a drain 120 formed in the semiconductor substrate 100, and a gate electrode 122 between the source 118 and the drain 120.

The drain 120 is electrically connected to the reflective electrode 116 via a connecting electrode 124, a capacitor 126 is disposed next to the gate electrode 122, and the gate electrode 122, the connecting electrode 124, and the capacitor 126 are separated from each other by an insulating layer 128.

When the semiconductor integrated circuit 110 applies a switching signal to the corresponding reflective electrode 116, the reflective electrode 116 and the transparent electrode 114 re-arrange the liquid crystal molecules to change the light transmittance of the pixels, thereby realizing a predetermined image.

While this invention has been particularly shown and described with reference to preferred embodiments thereof, it will be understood by those skilled in the art that various changes in form and details may be made therein without departing from the spirit and scope of the invention as defined by the appended claims. For example, the bonding structure according to the present invention can be applied to other flat panel displays besides the LCOS panel shown in FIG. 9. Therefore, the scope of the invention is defined not by the detailed description of the invention but by the appended claims, and all differences within the scope will be construed as being included in the present invention.

As described above, according to the flat panel display including the bonding structure of the present invention, the central portion of the active area is compensated about 0.1 μm or more, the uniformity deviation of the cell gap between the upper substrate and the lower substrate can be within a range of −5% ~+5%.

Therefore, in the bonding process of the upper and lower substrates of the flat panel display, the yield is 20% in the conventional art using the spacer, however, in the present invention, the yield is improved to more than 70% using the bonding structure.

Since the cell gap of the flat panel display can be maintained at a constant by the outer separation wall 18 and the inner separation wall 19 that are formed of $SiO_2$, the additional spacer is not required, thereby decreasing the manufacturing costs of the flat panel display.

Also, the bonding structure according to the present invention can prevent the sealant from infiltrating the active area, and improve the flow of liquid crystal to be smooth when the liquid crystal is injected into the display. In addition, the bonding structure can prevent the gas generated by the sealant in the thermal process of sealant from infiltrating the active area.

In addition, the upper substrate and the lower substrate can be supported by modifying the outer separation wall and the inner separation wall of the bonding structure, and it can prevent the sealant applied between the outer and inner separation walls from being released out of the outer separation wall. In addition, since the gas generated from the sealant when the sealant is heated and sealed can be discharged through the outer separation wall, infiltration of the gas to the active area can be prevented efficiently.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A bonding structure for a flat panel display device, which is formed between an upper substrate and a lower substrate to seal and bond the two substrates of the flat panel display device, the bonding structure comprising:
   an outer separation wall and an inner separation wall of equal heights both being arranged along edges of both the upper substrate and the lower substrate with a predetermined interval between the outer and inner separation walls; and
   a sealant applied between the outer separation wall and the inner separation wall,
   wherein the outer separation wall and the inner separation wall are bonded to the upper and lower substrates, and define a uniform, unimpeded cell gap between the upper and lower substrates and the inner separation wall, by operation of the outer and inner separation walls.

2. The bonding structure of claim 1, wherein the outer separation wall and the inner separation wall are bonded directly to surfaces of the upper and lower substrates that face each other.

3. The bonding structure of claim 1, wherein the outer separation wall includes a plurality of posts, which are arranged in two rows, and the posts in the two rows are arranged to be offset from each other.

4. The bonding structure of claim 1, wherein the inner separation wall includes a plurality of bars arranged in two rows, and the bars in different rows are arranged to overlap each other.

5. The bonding structure of claim 1, wherein the inner separation wall includes a plurality of H-shaped micro beams.

6. The bonding structure of claim 5, wherein the inner separation wall is formed by alternately arranging one H-shaped beam adjacent to a pair of H-shaped beams.

7. The bonding structure of claim 1, wherein the inner separation wall includes a plurality of U-shaped micro beams that are arranged in two rows, and the beams arranged in different rows are disposed to overlap each other.

8. The bonding structure of claim 1, wherein the outer separation wall and the inner separation wall are formed of a material having a lower thermal expansion coefficient than that of the sealant, and a larger Young's modulus than that of the sealant.

9. The bonding structure of claim 8, wherein the outer separation wall and the inner separation wall are formed of silicon oxide.

10. The bonding structure of claim 1, wherein each of the outer separation wall and the inner separation wall is formed to be of a height of 0.01 μm~10000 μm.

11. The bonding structure of claim 1, wherein each of the outer separation wall and the inner separation wall is formed to be of a width of 1 μm~10000 μm.

12. A method of forming a bonding structure that is formed between an upper substrate and a lower substrate of a flat panel display to seal and bond the two substrates, the method comprising:
   forming a silicon oxide layer directly on a surface of the lower substrate;
   forming an outer separation wall and an inner separation wall to be of equal heights, by patterning the silicon oxide layer to arrange both the outer separation wall and the inner separation wall along and bonded to edges of both the upper and lower substrates with a predetermined interval between the outer and inner separation walls, so as to define a uniform, unimpeded cell gap between the upper and lower substrates and the inner separation wall, by operation of the outer and inner separation walls; and
   applying a sealant in a space between the outer separation wall and the inner separation wall.

13. The method of claim 12, wherein the silicon oxide layer is deposited by a plasma enhanced chemical vapor deposition method.

14. The method of claim 12, wherein the forming of the outer and inner separation walls includes the operations of:
   applying a photoresist on the silicon oxide layer;
   exposing the photoresist using a photo mask that has patterns of the outer separation wall and the inner separation wall;
   forming an etching mask by developing the exposed photoresist; and
   etching the silicon oxide layer using the etching mask.

15. The method of claim 12, wherein the outer separation wall includes a plurality of posts arranged in two rows, and the posts in the two rows are arranged to be offset from each other.

16. The method of claim 12, wherein the inner separation wall includes a plurality of bars arranged in two rows, and the bars in different rows are arranged to overlap each other.

17. The method of claim 12, wherein the inner separation wall includes a plurality of H-shaped micro beams.

18. The method of claim 17, wherein the inner separation wall is formed by alternately arranging one H-shaped beam adjacent to a pair of H-shaped beams.

19. The method of claim 12, wherein the inner separation wall includes a plurality of U-shaped micro beams that are arranged in two rows, and the beams arranged in different rows are disposed to overlap each other.

20. A flat panel display comprising an upper substrate and a lower substrate facing each other with a predetermined interval, and a bonding structure formed between the upper and lower substrates to seal and bond the substrates, wherein the bonding structure includes:
   an outer separation wall and an inner separation wall of equal heights both being arranged along edges of both the upper substrate and the lower substrate with a predetermined interval between the outer and inner separation walls; and
   a sealant applied between the outer separation wall and the inner separation wall,
   wherein the outer separation wall and the inner separation wall are bonded to the upper and lower substrates, and define a uniform, unimpeded cell gap between the upper and lower substrates and the inner separation wall, by operation of the outer and inner separation walls.

21. The flat panel display of claim 20, wherein the outer separation wall and the inner separation wall are bonded directly to surfaces of the upper and lower substrates that face each other.

22. The flat panel display of claim 20, wherein the outer separation wall includes a plurality of posts arranged in two rows, and the posts in the two rows are arranged to be offset from each other.

23. The flat panel display of claim 20, wherein the inner separation wall includes a plurality of bars arranged in two rows, and the bars in different rows are arranged to overlap each other.

24. The flat panel display of claim 20, wherein the inner separation wall includes a plurality of H-shaped micro beams.

25. The flat panel display of claim 24, wherein the inner separation wall is formed by alternately arranging one H-shaped beam adjacent to a pair of H-shaped beams.

26. The flat panel display of claim 20, wherein the inner separation wall includes a plurality of U-shaped micro beams that are arranged in two rows, and the beams arranged in different rows are disposed to overlap each other.

27. The flat panel display of claim 20, wherein the outer separation wall and the inner separation wall are formed of a material having a lower thermal expansion coefficient than that of the sealant, and a larger Young's modulus than that of the sealant.

28. The flat panel display of claim 27, wherein the outer separation wall and the inner separation wall are formed of silicon oxide.

29. The bonding structure of claim 1, wherein heights of the inner and outer separations walls are each substantially 1 μm.

30. The bonding structure of claim 1, wherein the upper substrate is a transparent substrate and the lower substrate is a semiconductor substrate.

31. The bonding structure of claim 1, wherein there are no spacers within an active area, the active area being defined as a pixel area in the cell gap of the flat panel display device.

32. The bonding structure of claim 1,
wherein the inner separation wall includes a plurality of bars arranged in a plurality of rows, and
wherein the bars in any two consecutive rows are arranged to be offset from each other.

33. The bonding structure of claim 1, wherein the inner separation wall includes a plurality of bars arranged in a plurality rows such that a bar in any row overlaps at least one bar in a different row.

34. The bonding structure of claim 5, wherein the inner separation wall is formed by alternately arranging a first set of one or more H-shaped beams in a first direction followed by a second set of one or more H-shaped beams such that the first set of one or more H-shaped beams is offset from the second set of one or more H-shaped beams.

35. The bonding structure of claim 34, wherein each H-shaped beam of the first set of one or more H-shaped beams overlaps at least a portion of at least one H-shaped beam of the second set of one or more H-shaped beams in a direction substantially parallel to the first direction or in a second direction substantially perpendicular to the first direction or in both the direction substantially parallel to the first direction and the second direction.

36. The bonding structure of claim 1,
wherein the inner separation wall includes a plurality of U-shaped micro beams arranged in a plurality of rows, and
wherein the U-shaped micro beams in any two consecutive rows are arranged to be offset from each other.

37. The bonding structure of claim 36, wherein each U-shaped beam of a first row of the plurality of rows overlaps at least a portion of at least one U-shaped beam of a second row of the plurality of rows adjacent to the first row.

* * * * *